N. Whitehall. Combined Cultivator & Planter.

[84.]

No. 118,567.

Patented Aug. 29, 1871.

Witnesses:
E. Wolff
Wm. H. C. Smith

Inventor:
N. Whitehall
per
Attorneys.

UNITED STATES PATENT OFFICE.

NICHOLAS WHITEHALL, OF NEWTOWN, INDIANA.

IMPROVEMENT IN SULKY-CULTIVATORS.

Specification forming part of Letters Patent No. 118,567, dated August 29, 1871.

*To all whom it may concern:*

Be it known that I, NICHOLAS WHITEHALL, of Newtown, in the county of Fountain and State of Indiana, have invented a new and useful Improved Cultivator; and I do hereby declare that the following is a full, clear, and exact description thereof, which will enable others skilled in the art to make and use the same, reference being had to the accompanying drawing forming part of this specification.

This invention relates to a new and useful improvement in machines for cultivating corn; and consists in the construction, arrangement, and combination of parts hereinafter described.

Figure 1:
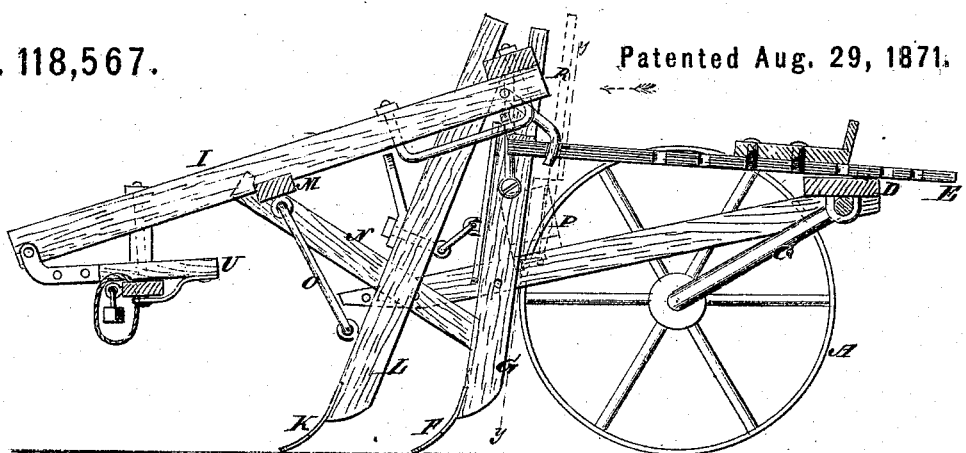
Figure 2:
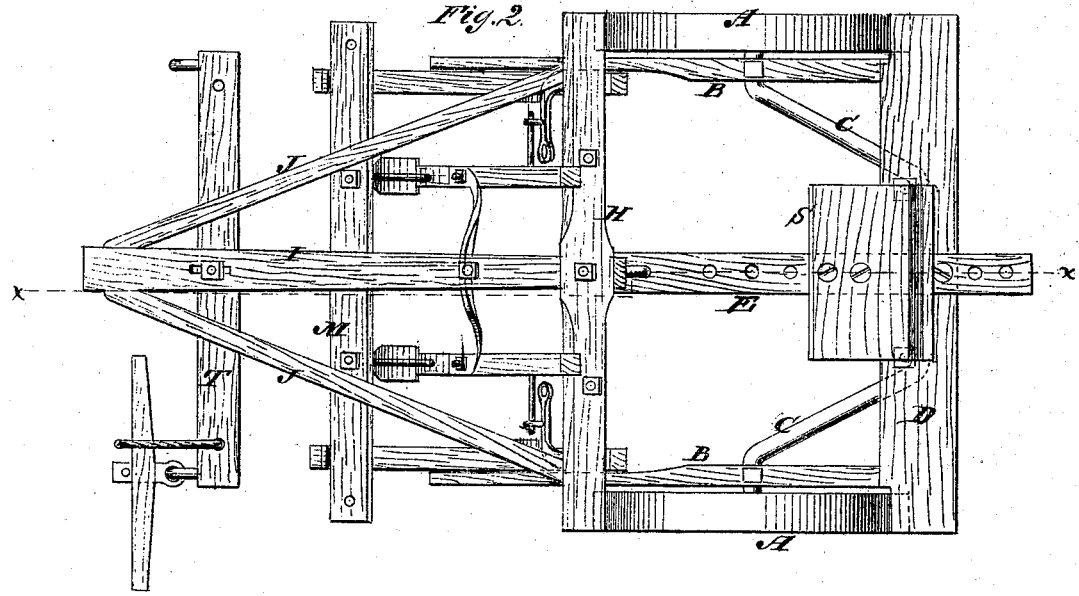
Figure 3:
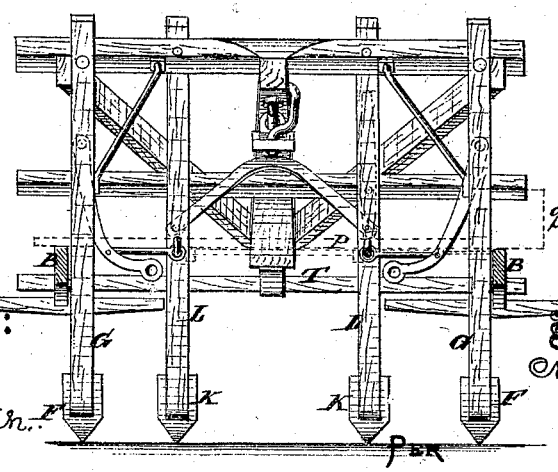

In the accompanying drawing, Figure 1 is a vertical longitudinal section of the machine taken on the line $x\ x$ of Fig. 2. Fig. 2 is a plan view. Fig. 3 is a cross-section of Fig. 1 taken on the line $y\ y$ looking in the direction indicated by the arrow.

Similar letters of reference indicate corresponding parts.

A A are the wheels upon which the machine is mounted. B B are the bearing-bars, supported by the bent axle C just inside the wheels, as seen in Fig. 2. The axle extends backward and rises so as to support the cross-piece D. E is a longitudinal seat-bar, the rear end of which is supported by and is adjusted on the cross-piece D. F F represent the two outside cultivator-teeth, which are attached to the inclined bars G G. H is a cross-bar by which the inclined tooth-bars G G are connected near their upper ends. I is a center-beam. J J are braces connected with the center-beam in front and with the inclined tooth-bars G G. This arrangement is seen in Fig. 2. K K are two middle cultivator-teeth on the ends of the flexible inclined bars L L. These bars are adjustably connected with the cross-bar H. M is another cross-piece attached to the under side of the braces J J and the center-beam I. N N are braces connected with the cross-piece M at their upper ends, and with the outside tooth-bars G at their lower ends, as seen in Fig. 1. The middle tooth-bars L L are supported from the cross-piece M by the joint-rods O O. The middle tooth-bars are allowed free lateral play by reason of being pivoted at their upper ends to the cross-bar H. They are connected by a curved bar, as shown in Fig. 2, so that they move simultaneously and preserve the same distance apart. A foot-support or curved bar is connected to each, as shown in Fig. 3, so that the driver may easily guide the shovels to escape stones or other obstacles. This arrangement of the toothed bars admits of the attachment of a planting device in rear of them and resting on the bearing-bars B B. A seed-box, P, is shown in dotted lines, Fig. 1, and a lever, R, for operating the seed-slide. S is the driver's seat. T is the evener, attached to the adjustable draft-piece U, as seen in Fig. 1.

It will be seen that the line of draft may be varied by properly adjusting the draft-piece, which is hinged to the forward end of the center-beam. The evener may be so connected with the draft-piece (by a wooden pin, for instance) that the team will be released by the breaking of the pin when the cultivator strikes an obstruction. The whiffletrees may be connected with the evener in a similar manner. By such an arrangement the machine is adapted for rough and uneven ground.

I lay no claim to use of pivoted toothed bars, *per se;* but,

Having thus described my invention, I claim as new and desire to secure by Letters Patent—

The improved machine formed by the arrangement of the tooth-bars G G and L L and foot-supports or levers, center-beam I, beams J J and N N, cross-pieces H and M, bent axle C, cross-piece D, bar E, and bearing-bars B B, as shown and described, operating as specified.

NICHOLAS WHITEHALL.

Witnesses:
WM. M. RICE,
MOSES CLAMSON.